Oct. 17, 1933.   L. PANZER   1,930,768
FOOD CHOPPER
Filed July 14, 1930   2 Sheets-Sheet 1

INVENTOR
Louis Panzer
BY
His ATTORNEY

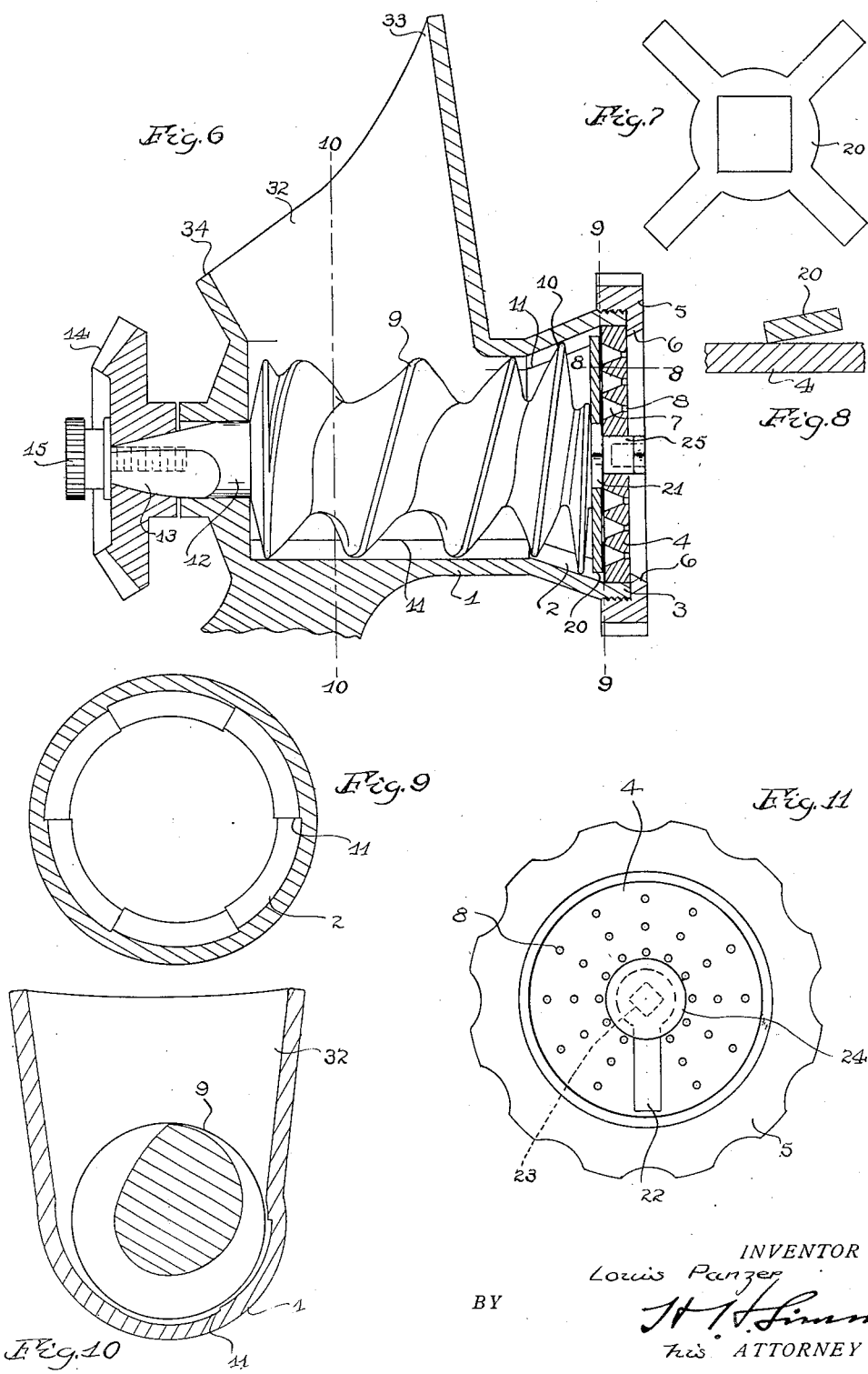

Patented Oct. 17, 1933

1,930,768

UNITED STATES PATENT OFFICE 1,930,768

FOOD CHOPPER

Louis Panzer, Rochester, N. Y.

Application July 14, 1930. Serial No. 467,664

1 Claim. (Cl. 146—189)

The present invention relates to food choppers and an object thereof is to provide a chopper which in addition to being capable of chopping food of all kinds may be employed for forming short noodles or macaroni. Another object of the invention is to provide a food chopper which may be positioned to discharge either vertically or horizontally. Still another object of the invention is to provide a novel form of a feeding helix in a food chopper. A further object of the invention is to provide a food chopper in which a helix operates in a casing to carry the food over knives on the interior faces of the casing wall.

To these and other ends, the invention consists of certain parts and combinations of parts all of which will be hereinafter described: the novel features being pointed out in the appended claim.

In the drawings:

Fig. 6 is an enlarged vertical section showing the cutter for general use in position;

Fig. 7 is a detail view of the cutter for general use;

Fig. 8 is a section on the line 8—8, Fig. 6;

Fig. 9 is a section on the line 9—9, Fig. 6;

Fig. 10 is a section on the line 10—10, Fig. 6; and

Fig. 11 is a face view of the discharge of the chopper with the noodle or macaroni cutter in position.

Figure 1:
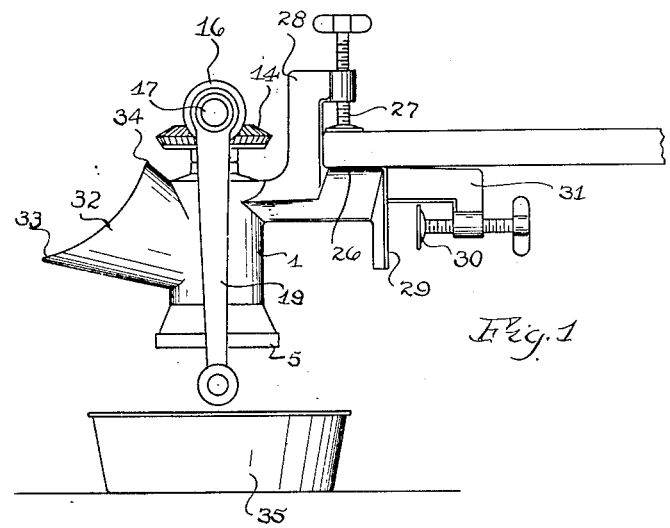
Fig. 1 is a side view of a food chopper embodying the present invention adjusted for making noodles or macaroni.
Figure 4:
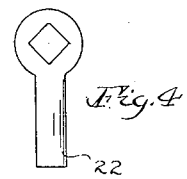
Fig. 4 is a detail view of the noodle cutter.
Figure 2:
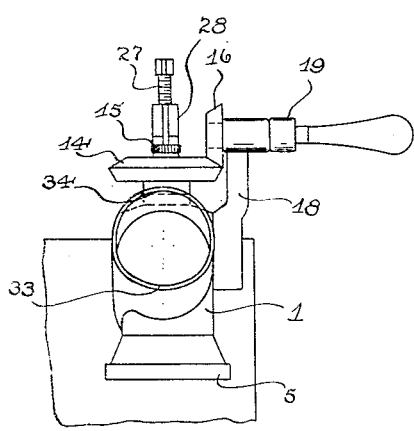
Fig. 2 is a plan view.
Figure 3:
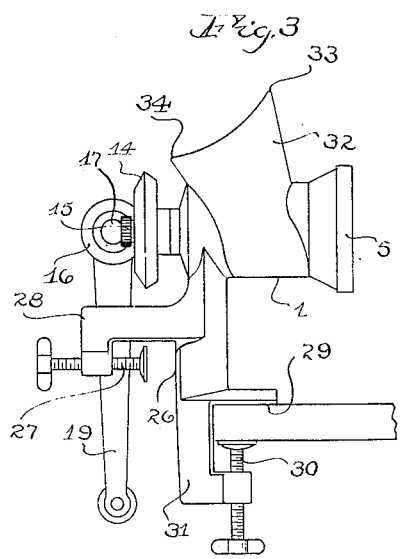
Fig. 3 is a side view showing the machine adjusted for chopping either types of food.
Figure 5:
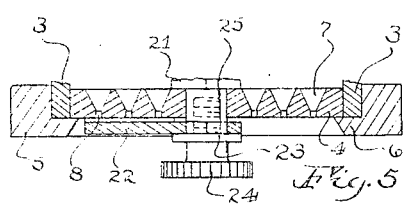
Fig. 5 is a fragmentary section showing the noodle cutter cooperating with the extruding or cutting plate.

In the illustrated embodiment of the invention, there is employed the casing 1 with a substantially cylindrical portion flaring at its discharge end at 2 to a cylindrical seat 3 for a cutter or extruding plate 4 which is held to the seat by a holding ring 5 engaging external threads on the casing and provided with an internal flange 6 cooperating with the outer face of the cutter or extruding plate 4. The cutter plate or extruding plate, in this instance, has a plurality of openings 7 which taper toward the outer face of the plate except adjacent their outer ends where at 8 they are cylindrical.

Within the casing operates a combined feeder and cutter, in this instance in the form of a helix having a cylindrical high pitch portion 9 adjacent its intake end fitting the cylindrical portion of the casing and a flaring low pitch portion 10 fitting the flaring portion 2 adjacent the discharge end and close to the cutter plate. The inner face of the wall of the cylindrical portion 1 is provided with longitudinally extending knife edges 11 which cut the food as the latter is moved by the feeding helix.

Movement of the helix may be effected through a shaft 12 and the helix journalled in the end wall of the casing and having a tapered portion 13 on which a bevel gear 14 is held by a set screw 15. With this bevel gear 14 a bevel gear 16 meshes, the latter being arranged on a shaft 17 journalled in a bracket arm 18 integral with the casing. A crank handle 19 is arranged on the shaft 17 and serves for turning the helix through the bevel gearing. In this way, the handle operates in a plane to one side of the chopper casing.

Two means may be provided for cutting the material moved by the helix. In one case a multibladed knife 20 is secured to a non-circular portion 21 on the helix between the end of the tapered high pitch portion and the cutter plate 4 being held in position by said plate to operate over the inner face of the latter and cut up the material forced to the cutter plate by the helix. This is particularly designed for cutting all food where fine chopping is required.

In another instance, a single bladed cutter or knife 22 is employed arranged on a non-circular portion 23 carried by the helix beyond the portion 21 and beyond the cutter plate 4. The cutter is held to said non-circular portion 23 by a thumb screw 24. Between the two non-circular portions 21 and 23 the helix carries a circular portion 25 which turns in the cutter plate.

The casing carries two supporting means one for supporting the casing vertically when the cutter 22 is employed as for cutting noodles or macaroni. This supporting means embodies a fixed jaw 26 for cooperating with the under side of a board and an adjusting screw 27 on a bracket arm 28 overhanging said fixed jaw 26. The face of the jaw 26 is perpendicular to the axis of turning of the helix.

The other supporting means comprises a fixed clamping jaw 29 parallel with the axis of turning of the helix and having cooperating therewith a movable clamping jaw 30 which is carried by an arm 31 overhanging said fixed jaw 29. A board is designed to be clamped between the two jaws 29 and 30 to sustain the casing in a horizontal position when the multibladed cutter 20 is employed.

With the end in view of feeding material to the casing whether the latter be supported vertically or horizontally, a hopper of novel construction is employed. In this instance, this hopper 32 projects laterally from the casing and inclines adjacent the end opposite the discharge end. The hopper also inclines toward such discharge end and has that portion of its wall nearest the discharge end longer than the portion adjacent the other end of the casing. In other words, the mouth of the hopper lies in a plane at an oblique angle to the axis of rotation of the feeder or helix, that portion 33 of the mouth nearest the discharge end being farther from the axis of the helix than the portion 34 farthest from the discharge of the casing. In this way the hopper can be used whether the helix is vertically or horizontally arranged. The purpose of arranging the helix vertically is to permit the noodles to fall from the discharge without contacting with each other until they reach the receiver 35. In this way they maintain their shapes better.

What I claim as my invention and desire to secure by Letters Patent is:

In a food chopping machine, a casing providing a feeding-in portion, a helix receiving portion, and a supporting member providing two supporting means each of which comprises a fixed clamping jaw and has an adjusting or clamping screw the axis of which is perpendicular of the face of the fixed jaw with respect to which the particular screw cooperates, a feeding helix located in said helix receiving portion, means for rotating said feeding helix about its longitudinally extending axis, and an extruding plate carried by the casing and located at the forward or delivery end of the feeding helix, said casing being constructed so that its feeding-in portion extends laterally from one side of the casing in such a manner that in use it directs food to be chopped in a general forward and inward direction to the rear or receiving end of the feeding helix, said casing also being constructed so that the supporting member thereof extends laterally from the other side of the casing and is constructed so that it has two fixed resisting members that provide the fixed clamping jaws and so that it has corresponding branch bracket arms, the construction being such that one of said fixed clamping jaws extends longitudinally, forwardly and substantially parallel to the axis of the helix, and so that the bracket arm corresponding thereto has a laterally and outwardly extending spacing portion terminating in an arm that extends longitudinally and forwardly and which arm has a transversely or laterally extending screw threaded opening therethrough into and through which there extends the clamping or adjusting screw that corresponds to said longitudinally extending fixed clamping jaws, the construction also being such that the other of said fixed clamping jaws extends laterally, outwardly and substantially at right angles to the axis of the helix, and so that the bracket arm corresponding thereto has a longitudinally and rearwardly extending spacing portion terminating in an arm that extends laterally and outwardly and which arm has a longitudinally extending screw threaded opening therethrough into and through which there extends the clamping or adjusting screw that corresponds to said laterally extending fixed clamping jaws.

LOUIS PANZER.